(12) United States Patent
Brisse

(10) Patent No.: US 6,433,697 B1
(45) Date of Patent: Aug. 13, 2002

(54) COMMUNICATION APPLIANCE HAVING AN EMERGENCY BATTERY AS WELL AS A METHOD FOR SETTING UP SAID COMMUNICATION APPLIANCE

(75) Inventor: Konrad Brisse, Hattingen (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/379,670

(22) Filed: Aug. 24, 1999

(30) Foreign Application Priority Data

Aug. 25, 1998 (DE) .......................................... 198 38 662

(51) Int. Cl.[7] .............................................. G08B 21/00
(52) U.S. Cl. ...................... 340/636; 320/106; 320/112; 320/113; 320/137; 340/693.1
(58) Field of Search ................................ 340/636, 660, 340/693.1; 320/106, 128, 112, 113, 137, 114; 455/572, 7; 429/90, 94

(56) References Cited

U.S. PATENT DOCUMENTS

| 4,622,544 A | 11/1986 | Bailly ........................ 340/636 |
| 5,460,090 A | 10/1995 | Syrjala ........................ 429/90 |
| 5,489,834 A | 2/1996 | Pitkanen ....................... 320/15 |
| 5,635,813 A | * 6/1997 | Shiga et al. .................. 320/106 |
| 5,680,252 A | 10/1997 | Sitter, Jr. et al. ............ 359/566 |
| 5,701,068 A | * 12/1997 | Baer et al. .................... 320/106 |
| 5,857,151 A | 1/1999 | Heinonen et al. ........... 455/349 |
| 6,014,008 A | * 1/2000 | Hartzell et al. .............. 320/106 |
| 6,020,082 A | * 2/2000 | Orlando ......................... 429/7 |
| 6,212,410 B1 | * 4/2001 | Ishida ......................... 455/572 |
| 6,249,105 B1 | * 6/2001 | Andrews et al. ............. 320/106 |

FOREIGN PATENT DOCUMENTS

| DE | 4228234 A1 | 3/1994 |
| DE | 19641901 C1 | 3/1998 |

* cited by examiner

Primary Examiner—Daniel J. Wu
Assistant Examiner—Davetta W. Groins
(74) Attorney, Agent, or Firm—Perman & Green, LLP

(57) ABSTRACT

The invention describes a communication appliance (2) having an emergency battery (10) which can be inserted and which is provided with an electronically readable nominal coding; a read device (11) for identifying the nominal coding or a different coding; a signal generating device (11) for producing a new battery identification signal when the nominal coding is identified; and a write device (11, T) which, after the nominal coding has been identified, converts this coding into a different coding.

21 Claims, 1 Drawing Sheet

COMMUNICATION APPLIANCE HAVING AN EMERGENCY BATTERY AS WELL AS A METHOD FOR SETTING UP SAID COMMUNICATION APPLIANCE

The invention relates to a method for setting up a communication appliance having an emergency battery, to such a communication appliance and to a battery pack which is provided for the communication appliance.

For the purposes of the present invention, the term communication appliance should be understood to mean various apparatuses. For example, the communication appliance may be an appliance for a car telephone system, in which case the communication appliance is then supplied mainly from the motor vehicle battery and is connected to a telephone handset and to a plurality of antennas, one of which may be an emergency antenna which is preferably located in the interior of the motor vehicle. The other antennas, which are arranged on the outside of the motor vehicle, may be, for example, a GSM (Global System for Mobile Communication) antenna or a GPS (Global Positioning System) antenna.

On the other hand, for the purposes of the invention, a communication appliance may alternatively be understood to mean a portable radio telephone or a mobile phone which has an emergency battery in addition to the normal battery.

Such communication appliances are being used increasingly these days, even to provide safety-relevant services. These safety-relevant services may be the transmission of specific help signals to a service station or a help organization, so that it is necessary to ensure that it is still possible to transmit such help signals, for example, even after a motor vehicle accident or after the main supply battery has been operated for a relatively long period.

If an emergency situation occurs and the main supply battery is no longer ready to operate, then, in general, a change is made to the emergency battery. In this case, it is assumed that the emergency battery can then still supply sufficient energy to transmit the help signals.

As a rule, the charge state of the emergency battery is monitored continuously, with the information relating to this being buffer-stored in a memory. If the charge state falls or if battery replacement is required, then this can be indicated by appropriate warning signals. In this case, the old emergency battery should be replaced by a new emergency battery, since this is the only way to ensure that, if necessary, help signals can be sent even over a lengthy time period.

The invention is based on the object, for checking that an emergency battery which has been inserted into a communication appliance has not yet been used, of specifying a method which is suitable for this purpose as well as a suitable communication appliance and, not least, a battery pack which is adapted to this purpose for the communication appliance.

The appropriate solutions are contained in claims 1, 11 and 19. Advantageous refinements of the invention can be found in the respective dependent sub-claims.

A method according to the invention for setting up a communication appliance comprises the following steps: an emergency battery which is provided with an electronically readable nominal coding is inserted in the communication appliance; if the emergency battery has the nominal coding during a subsequent read process, a new battery identification signal is produced and, after identifying the nominal coding, this coding is converted into a different coding.

In other words, if an emergency battery which has not yet been used and is brand new is inserted in the communication appliance, then this is initially accepted by the identification of the nominal coding, but is then immediately cancelled in that the nominal coding is changed and is replaced by a different coding. In an emergency, the emergency battery which has been inserted can now be accessed at any time. This ensures that the communication appliance is fully ready for operation, since the emergency battery has not yet been discharged at all.

The use of an emergency battery which no longer has the nominal coding can thus, in certain circumstances, be prevented. A plurality of cases would be feasible.

If an emergency battery which has been inserted were, for example, to be removed from the communication appliance and to be reinserted again immediately, and if the reading of the nominal coding were to be initiated once again whenever an emergency battery was newly inserted, then the emergency battery which had then been inserted into the communication appliance for a second time would no longer be accepted by it since it no longer has the nominal coding. In fact, when it was first inserted, this was converted into a different coding, so that when it was inserted for a second time, the new battery identification signal is no longer produced. In fact, a warning signal could now be emitted, and the user could be requested to insert an emergency battery which is actually new, and which still has the nominal coding.

Alternatively, it would be feasible, after the initial insertion of a new emergency battery and the reading of its nominal coding, to suppress further read cycles of the nominal coding for a specific time period, so that it would be possible to remove the emergency battery briefly and reinsert it during this time period without a warning signal being produced. However, in this case, it would be necessary to ensure in a different way that the newly inserted emergency battery which no longer has the nominal coding still has a sufficiently high charge state. The end of the specific time period occurs when the device produces a new battery request signal, that is to say provides a reminder to replace the emergency battery. The new battery request signal is produced, for example, when it has been used for emergency purposes a given number of times, the operating duration has reached a predetermined value, the no-load voltage of the emergency battery has fallen to zero, etc. The protection function which is achieved by converting the nominal coding into a different coding would then, in this case, occur only after the specific time period had elapsed.

The new battery identification signal may, for example, be buffer-stored and, in the last-mentioned case, would not be erased until after the predetermined time period had elapsed.

Information corresponding to the charge state of the emergency battery can be stored in a memory, in which case the memory may also contain a counter which, for example, stores the operating duration of the emergency battery, for example by counting the operating hours. In this case, the new battery request signal can be produced once the charge state of the emergency battery has fallen below a predetermined value or its operating duration has exceeded a further predetermined value. A read process for reading the nominal code of the emergency battery can thus be carried out as a function of the new battery request signal, for example when the new battery request signal appears. The new battery request signal thus defines the end of the time period which has already been mentioned above, after which the full protection function is achieved.

According to an advantageous refinement of the invention, once the nominal coding of the emergency battery has been identified, the memory in which information about the charge state of the previously used emergency battery is stored is erased, in order now to allow information to be stored about the charge state of the newly inserted emergency battery. Instead of erasing the memory, the information can be saved in a further memory in order to allow subsequent checking of all the operating states of the device, if this is necessary.

The nominal coding may be contained, for example, in a programmable electronic memory which is reprogrammed once the new battery identification signal has been produced, so that it now no longer contains the nominal coding but a different, or converted, coding.

Alternatively, the nominal coding could, however, also be provided by a conductive fuse, in which case the fuse is interrupted once the nominal coding has been identified. In the case of a fuse link, the fuse could blow for this purpose.

A communication appliance according to the invention contains an emergency battery which can be inserted and is provided with an electronically readable nominal coding; a read device for identifying the nominal coding or a different coding; a signal generating device for producing a new battery identification signal when the nominal coding is identified and, possibly, for producing a warning signal if the nominal coding is not identified; as well as a write device which, once the nominal coding has been identified, converts this coding into a different coding.

The emergency battery itself may contain one or more battery cells. In this case, only a single nominal coding is provided, preferably and not least for financial reasons. All the battery cells are thus tested at the same time by checking the nominal coding. In this case, the electrically readable nominal coding may be arranged, for example, immediately on one of these battery cells. However, it is also possible to apply the electronically readable nominal coding to a battery pack in which the battery cells are located. This battery pack is then supplied from the factory with the battery cells and the integrated nominal coding.

A particularly advantageous battery pack has a housing which accommodates the battery cells, to which housing the electronically readable nominal coding is applied. This housing may also be a shrink film or some other suitable container. In this case, the nominal coding may be located in the interior of the battery pack, so that it thus cannot be readily damaged. The battery pack itself has two supply connections (+ and –), between which the terminals of the battery cells are located and which can be connected to corresponding connections of the communication appliance. Furthermore, a third connection is preferably located on the battery pack, between which and one of the other battery connections the nominal coding is present, for example in the form of a fuse link.

An exemplary embodiment of the invention will be explained in detail in the following text with reference to the drawing, in which.

Figure 1:
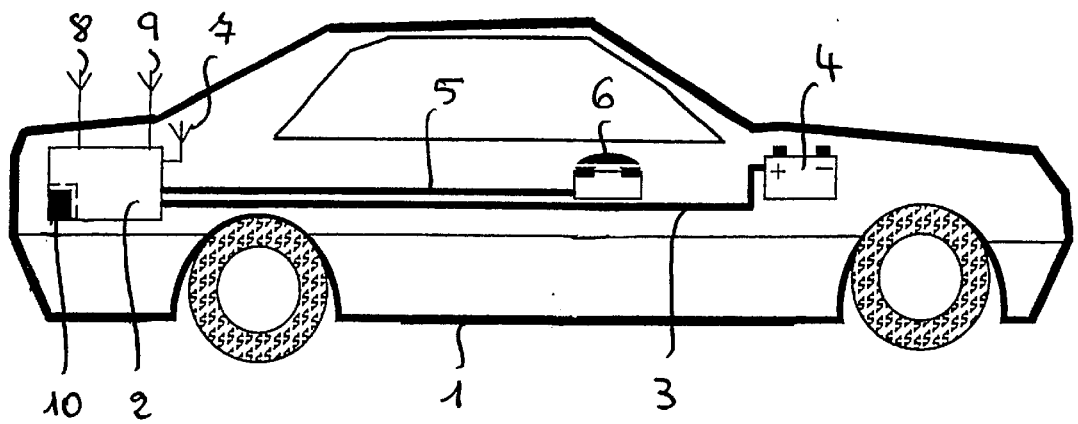
FIG. 1 shows a motor vehicle equipped with a communication platform.

FIG. 1 shows a motor vehicle having a built-in communication platform. The communication platform comprises a communication appliance 2 which is accommodated in the boot of the motor vehicle 1 and is normally supplied with power from the battery 4 of the motor vehicle 1 via a line 3. The communication appliance 2 is furthermore connected via a line 5 to a telephone handset 6. This may be a conventional telephone handset with a rest for a handpiece, or some similar communication device. Furthermore, the communication appliance 2 is connected to a plurality of antennas, one of which is an emergency antenna 7 which is located in the interior of the motor vehicle 1. The other antennas 8 and 9 may be a GSM antenna as well as a GPS antenna. Furthermore, the communication appliance 2 may be connected to a monitor (which is not illustrated) for the driver of the motor vehicle 1, in order to provide him or her, for example with geographical position data or other information, in visual or audible form.

Not least, the communication appliance 2 contains an emergency battery 10 which, however, supplies the communication appliance 2 with power only when an emergency has occurred. This may be, for example, a motor vehicle accident, in which the antennas 8 and 9 are damaged and/or the battery 4 of the communication appliance 2 has been disconnected. In this case, the communication appliance 2, if it is still working, could transmit a help signal via the emergency antenna 7. This could be done automatically subject to predetermined conditions or, possibly, also by the driver of the motor vehicle 1.

Otherwise, the driver of the motor vehicle 1 can communicate with third parties under the control of the communication appliance 2, using the telephone handset 6 and using the antennas 8 and 9.

Figure 2:
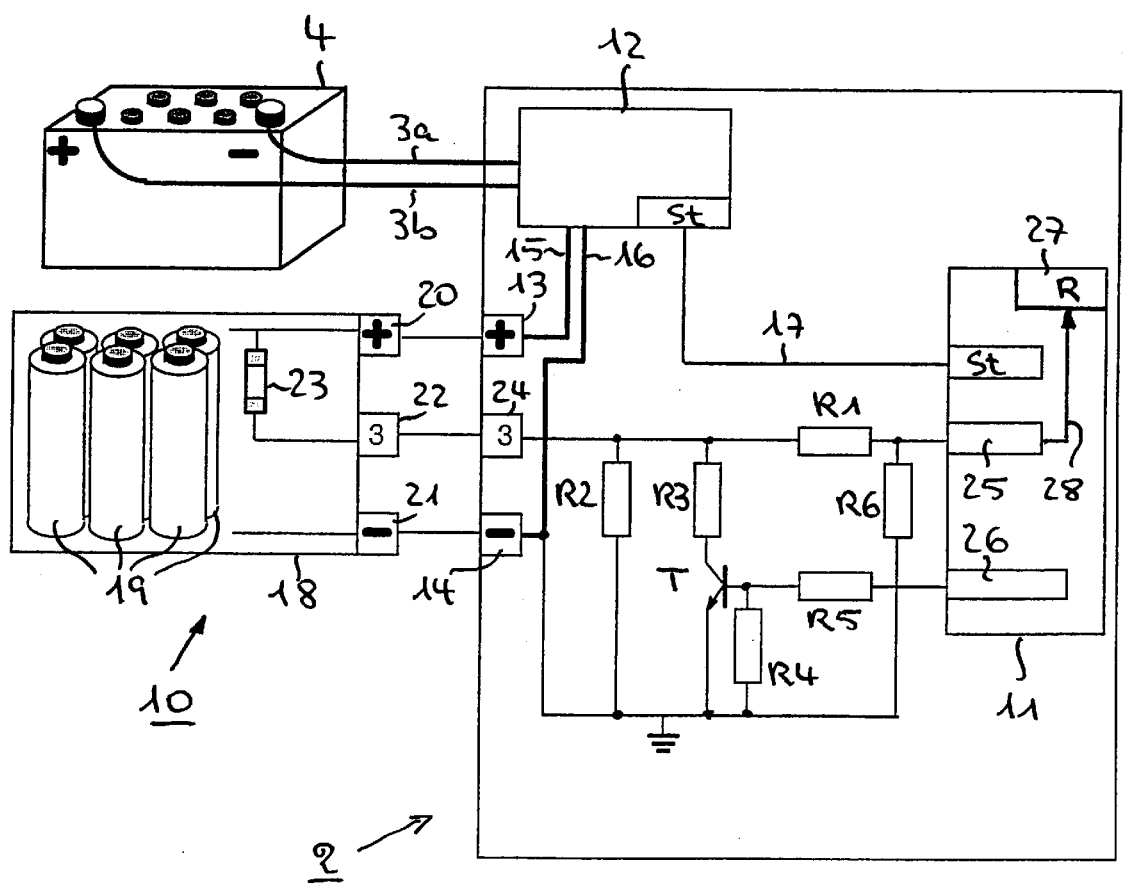
FIG. 2 shows a circuit diagram of part of the communication platform shown in FIG. 1.

FIG. 2 shows a circuit diagram of a part of the communication appliance 2, in conjunction with the motor vehicle battery 4 and the emergency battery 10.

The communication appliance 2 contains, inter alia, a microprocessor controller 11 for setting up communication links to other subscribers, as well as an energy management circuit 12. The already mentioned motor vehicle battery 4 is connected to the energy management circuit 12 via lines 3a and 3b. Furthermore, the energy management circuit 12 is connected to a positive terminal 13 and to a negative terminal 14 of the communication appliance 2, via lines 15 and 16. The emergency battery 10 can be connected to the positive terminal 13 and to the negative terminal 14, as will be described. Via a control line 17 between a control connection of the microprocessor controller 11 and a control connection of the energy management circuit 12, the latter receives a control signal, using which the energy management circuit 12 decides whether to draw power from the car battery 4 or from the emergency battery 10. The control signal which is present on the control line 17 is produced when an emergency situation has occurred, so that the energy management circuit 12 then switches over from the car battery 4 to the emergency battery 10, and draws energy from there in order to supply the communication platform, or the communication appliance 2.

The emergency battery 10 comprises a housing 18 in which, in the present case, six battery cells 19, for example, are located, which are connected to one another in a predetermined manner. On the outside of the housing 18, there are two contacts 20 and 21, of which the contact 20 is connected to a positive terminal of the battery cells 19, and the contact 21 is connected to a negative terminal. When the emergency battery 10 (battery pack) is inserted in the communication appliance, the contacts 20 and 13 on the one hand and the contacts 21 and 14 on the other hand make electrical contact, so that power can be drawn from the battery cell 19, by the energy management circuit 12, for the said emergency.

Furthermore, another contact 22 is provided on the housing 18 of the emergency battery 10, and is electrically connected via a fuse 23 to the positive contact 20. In the present case, the fuse is a fuse link which, in the conductive state, provides a quasi nominal coding. When the housing 18 is inserted in the communication appliance 2, the other contact 22 makes electrical contact with yet another contact 24 of the communication appliance 2, and this contact 24 is connected to a signal input 25 of the microprocessor controller 11.

The microprocessor controller 11 is provided with a signal output 26 at which a command to blow the fuse 23 appears if it has been found at the signal input 25 that the fuse 23 of the inserted emergency battery 10 has not yet been blown. Furthermore, there is also, inter alia, a memory device 27 within the microprocessor controller 11, which is connected to the signal input 25 via a line 28, and is used to store operating data relating to the emergency battery 10, gathered over the time in which the emergency battery 10 is located in the communication appliance 2 and is being operated. The corresponding connecting lines are not shown here, for the sake of clarity. The line 28 transmits only a reset signal to a reset input R of the memory device 27, in order to erase its contents and to reset it, as will be described below.

In order to allow the nominal coding of the fuse 23 to be read and in order, furthermore, to make it possible to blow the fuse 23, there is a further circuit device between the contacts 24 and 14 on the one hand and the contacts 25 and 26 on the other hand. This circuit device is thus used, inter alia, to read and to amend the nominal coding, and to read and amend the state of the fuse 23, which is located in a protective position in the interior of the housing 18 of the emergency battery 10.

The said circuit comprises a first resistor R1 between the contacts 24 and 25, a second resistor R2 between the contacts 24 and 14, a series circuit comprising a third resistor R3 and the collector-emitter path of a transistor T connected in parallel with the second resistor R2, a fourth resistor R4 between the base of the transistor T and its emitter, a fifth resistor R5 between the base of the transistor T and the signal output 26 of the microprocessor controller 11, and a sixth resistor R6 between the signal input 25 of the microprocessor controller 11 and the emitter of the transistor T, with the emitter furthermore being earthed.

The method of operation of the circuit shown in FIG. 2 will be described in more detail in the following text.

First of all, it is assumed that an emergency battery 10 with a fuse 23 which has not yet been blown has been inserted in the communication appliance 2. In this case, the energy management circuit 12 receives power from the car battery 4. Since the fuse 23 has not yet been blown, positive potential is supplied from the battery cells to the contact 22, and from there via the contact 24 and the resistor R1 to the signal input 25 of the microprocessor controller 11. As a result of the positive signal being received at the signal input 25, which may be regarded as a new battery identification signal, the memory device 27 is reset via the line 28, so that all the data relating to a previously used emergency battery are erased. In the future, operating data relating to the newly inserted emergency battery 10 and describing its charge state are then stored in the memory device 27.

Once a positive potential has been detected at the signal input 25, or the new battery identification signal has been detected, the microprocessor controller 11 emits an erase signal via the signal output 26. This erase signal is passed via the resistor R5 to the base of the transistor T, and switches it on. Since a high positive potential is still present at the contact 24, a relatively large current now flows via the resistor R3 and via the emitter-base junction of the transistor T to earth, resulting in the fuse 23 being blown. After this, the potential of the contacts 22, 24 and 25 is low. The new battery identification signal remains buffer-stored, however, for as long as the charge state of the emergency battery 10 is still sufficient, that is to say the new battery request signal has not yet been produced.

If the emergency battery 10 is removed from the communication appliance 2, once the new battery request signal has been produced and the new battery identification signal has been erased, the contacts 20, 22 and 21 are disconnected from the contacts 13, 24 and 14. If the same emergency battery 10, or an emergency battery which is similar but has already been used, is inserted once again into the communication appliance 2, that is to say a battery whose fuse 23 has already been blown, then no signal at a positive level and no new battery identification signal now appears at the signal input 25. This indicates that the emergency battery which has been inserted is a used battery and not a brand new battery. In fact, a warning signal appears which tells the user that the already used emergency battery must be replaced once again.

The warning signal may be produced, for example, when the high-level positive signal appears only at the contact 13, and no signal or an earth signal appears at the contact 24.

What is claimed is:

1. Method for setting up a communication appliance, comprising the steps of;
    inserting a battery in the communication appliance and providing the battery with an electronically readable nominal coding;
    subsequently subjecting the battery to a read process for the nominal coding and, if the battery is identified as having the nominal coding in the subsequent read process, producing a new battery identification signal; and
    after identification of the nominal coding, converting the nominal coding had by the battery into a different coding.

2. Method according to claim 1, further comprising the step of producing a warning signal if the nominal coding is not identified during the read process.

3. Method according to claim 1, further comprising the step of storing information corresponding to the charge state of the battery in a memory.

4. Method according to claim 3, wherein the memory includes a counter which counts the operating duration of the battery.

5. Method according to claim 3, further comprising the step of producing a new battery request signal once the charge state of the battery has fallen below a predetermined value, or its operating duration has exceeded a further predetermined value.

6. Method according to claim 5, wherein the read process for reading the nominal coding of the battery is not carried out until after the new battery request signal has been produced.

7. Method according to claim 6, wherein the new battery identification signal is buffer-stored.

8. Method according to claim 3, wherein after the nominal coding has been identified, the memory is erased.

9. Method according to claim 1, wherein the nominal coding is contained in a programmable electronic memory.

10. Method according to claim 1, wherein the nominal coding is provided by a conductive fuse, and the fuse is interrupted once the nominal coding has been identified.

11. Communication appliance comprising;
    a battery inserted therein and provided with an electronically readable nominal coding;
    a read device f or identifying the nominal coding with the battery or a different coding;

a signal generating device for producing a new battery identification signal when the nominal coding is identified as present with the battery; and a write device which, once the nominal coding has been identified as present, converts the nominal coding into the different coding.

12. Communication appliance according to claim 11, further comprising a programmable electronic memory which contains the nominal coding and is connected to the battery.

13. Communication appliance according to claim 11, further comprising a fuse connected to the battery and forming the nominal coding when in the conductive state.

14. Communication appliance according to claim 13, wherein the fuse is a fuse link.

15. Communication appliance according to claim 13, wherein the write device after identifying the nominal coding, sends an overcurrent through the fuse in order to interrupt it.

16. Communication appliance according to claim 11, wherein the battery has one or more battery cells.

17. Communication appliance according to claim 16, wherein the electronically readable nominal coding is applied directly to at least one of the battery cells.

18. Communication appliance according to claim 16, wherein the electronically readable nominal coding is applied to a battery pack which contains the battery cells.

19. Battery pack comprising:

a plurality of battery cells;

a housing surrounding said battery cells;

an electronically readable, variable nominal coding applied to the housing in the form of a conductive fuse, which nominal coding is convertible to a different coding; and wherein said battery pack comprises a plurality of connections including two power supply connections, and said conductive fuse is located between one of said two power supply connections and a third connection of the battery pack, and is interrupted when said nominal coding is converted to said different coding.

20. Method according to claim 1, wherein said battery comprises an emergency battery for said communication appliance.

21. Battery pack according to claim 19 wherein said conductive fuse comprises a fuse link that is blown when said nominal coding is converted to said different coding.

* * * * *